US008439217B2

(12) United States Patent
Brenneis et al.

(10) Patent No.: US 8,439,217 B2
(45) Date of Patent: May 14, 2013

(54) BARREL DOCKING AND OPENING APPARATUS

(75) Inventors: Christophe Brenneis, Saint Victor La Coste (FR); Atik Chaouch, Villeneuve Les Avignon (FR); Franck Laurent, Pont Saint Esprit (FR); Alain Gachon, Mornas (FR)

(73) Assignee: Commissariat a l'Energie Atomique et Aux Energies Alternatives, Paris (FR)

(*) Notice: Subject to any disclaimer, the term of this patent is extended or adjusted under 35 U.S.C. 154(b) by 24 days.

(21) Appl. No.: 12/996,271

(22) PCT Filed: Jun. 10, 2009

(86) PCT No.: PCT/EP2009/057217

§ 371 (c)(1),
(2), (4) Date: Mar. 7, 2011

(87) PCT Pub. No.: WO2009/150191

PCT Pub. Date: Dec. 17, 2009

(65) Prior Publication Data

US 2011/0185678 A1 Aug. 4, 2011

(30) Foreign Application Priority Data

Jun. 13, 2008 (FR) ..................................... 08 53930

(51) Int. Cl.

| | |
|---|---|
| ***B65D 39/12*** | (2006.01) |
| ***F16J 15/48*** | (2006.01) |
| *B65D 45/00* | (2006.01) |
| *B65D 53/00* | (2006.01) |

(52) U.S. Cl.
USPC ............ 220/232; 215/269; 277/646; 220/327

(58) Field of Classification Search .................. 220/232, 220/849, 810, 328, 833, 4.04, 222, 221, 216, 220/259.5, 259.1, 256.1; 215/269, 237, 200; 277/331, 583, 646, 332, 334, 645, 644; *B65D 53/00, B65D 39/12; F16J 15/48, 15/46*
See application file for complete search history.

(56) References Cited

U.S. PATENT DOCUMENTS 1,331,005 A * 2/1920 Duncan ...................... 220/573.1
1,359,875 A * 11/1920 Da Costa ...................... 220/228

(Continued)

FOREIGN PATENT DOCUMENTS

DE 42 17 118 A1 12/1993
DE 203 08 805 U1 10/2003

(Continued)

OTHER PUBLICATIONS

International Search Report issued Jul. 23, 2009, in International Application No. PCT/EP2009/057217.

*Primary Examiner* — Mickey Yu
*Assistant Examiner* — Robert J Hicks
(74) *Attorney, Agent, or Firm* — Oblon, Spivak, McClelland, Maier & Neustadt, L.L.P.

(57) ABSTRACT

An apparatus including a flange topped by a fitting including a trap adapted to seize and drive a lid of a barrel for opening the same and two inflatable gaskets equipping the flange and the trap that are inflated for clamping the container and the lid of the barrel at the connection thereof. Contamination inside the barrel and inside the upper enclosure will only spread over small surfaces of the apparatus between the gaskets and to the connection of both parts of the barrel.

18 Claims, 2 Drawing Sheets

U.S. PATENT DOCUMENTS

| | | | | | |
|---|---|---|---|---|---|
| 1,665,369 | A | * | 4/1928 | Joy et al. | 220/324 |
| 1,958,923 | A | * | 5/1934 | Mohler | 220/325 |
| 2,691,460 | A | * | 10/1954 | Barnebey | 220/232 |
| 2,785,824 | A | * | 3/1957 | Reeves | 220/232 |
| 3,285,308 | A | * | 11/1966 | Stambaugh | 383/59 |
| 3,694,962 | A | * | 10/1972 | McDonald et al. | 49/477.1 |
| 4,081,093 | A | * | 3/1978 | Eberle | 414/421 |
| 5,105,966 | A | * | 4/1992 | Fort et al. | 220/327 |
| 6,959,833 | B1 | | 11/2005 | Paul | |
| 7,178,810 | B1 | * | 2/2007 | Kuhary | 277/646 |

FOREIGN PATENT DOCUMENTS

| | | | | |
|---|---|---|---|---|
| EP | 582028 | A1 | * | 2/1994 |
| JP | 10-111398 | | | 4/1998 |
| WO | WO 95/23617 | | | 9/1995 |

* cited by examiner

BARREL DOCKING AND OPENING APPARATUS

This invention relates to a barrel docking and opening apparatus; the relevant barrels comprise a main container part and a lid top of the container.

When opening such barrels for loading or decanting the content thereof precautions have to be taken if such content is toxic, radioactive, or otherwise hazardous, because then contamination will spread on the outside. The involved industries have designed many docking and opening devices for solving this problem. Some of them consist in working within enclosures, which are sealed or maintained at a vacuum in relation to the environment. Others include double-door mechanisms, wherein the barrel is mounted on an opening, which is then closed by a door leading to an insulated enclosure. The door covers the lid and seizes the same by interlocking the shapes thereof when it is open, thereby separating the lid from the container while separating the door from the opening and communicating the inside of the barrel with the inside of the enclosure. Gasket systems allow for the lid to form a closed cavity with the door so that contamination within the enclosure will not reach the upper side thereof. Also, further gaskets arranged between the opening of the enclosure and the container will maintain contamination within the enclosure and prevent it from reaching the outer side of the container. Thereby, the external surface of the barrel will stay clean. Such double-door devices are efficient and reliable, but it has to be acknowledged that they are complex in terms of composition, both regarding the mechanisms for joining the door to the lid and the required gaskets. It would often be desirable to have an apparatus which is much more simple, but useful under circumstances where slight contamination of the outside is tolerable.

Such an apparatus allowing for some minor contamination while, however, taking over some of the principles of the double-door mechanism, has been designed for flat lid petrol barrels. The rim of the container is lined on the inside by a gasket comprising two right-angled lips: a cylindrical interior lip bonded to the internal side of the container, and a planar lip joined to the bottom of the preceding one. The lid is introduced into the container by friction against the cylindrical lip until it comes into abutment at the planar lip. The docking apparatus comprises a flange for holding the container and a lid coupling door initially assembled with the flange. An interior ring of the flange, adjacent to the door, is contacted by the upper side of the cylindrical lip of the gasket when docking takes place. The door and the lid are then tight-fitting and can be coupled together. Next, the door is simply raised for pulling off the lid of the container and opening the barrel. By covering the lid, the door protects the upper side thereof from contamination, and the contact of the lower ring of the flange against the cylindrical lip of the gasket will maintain sealing provided by the flange and the container.

This design has the drawbacks of requiring locking via mechanical means between the door and the lid, of being applicable to specific barrels wherein the effort of pulling off the lid has to be significant as it is the gasket retaining the same by applying friction, and of requiring for the barrel to be positioned precisely under the flange as the ring in touch with the gasket must be perfectly centered therewith. Finally, this device is applicable only to flat lids.

The object of the invention is thus to create a docking apparatus without such drawbacks and applicable to a larger number of barrels, due to a lack of interaction between the docking device and a possible gasket between the container and the lid of the barrel.

According to a general aspect, this invention relates to a barrel docking and opening apparatus comprising a container and a top lid, the apparatus comprising a flange for clamping the barrel in an opening of the flange and an assembly for seizing and lifting the lid arranged above the flange, characterized in that the flange comprises a first inflatable gasket around the opening and which ensures clamping of the barrel, and the assembly comprises a mobile trap, which can be placed on the flange while enclosing the lid, and said trap comprises a second inflatable gasket overlapping the first inflatable gasket when the trap is placed on the flange and which ensures that the lid is seized.

The overlapping inflatable gaskets allow for the container and the lid to be inserted before being separated as soon as the trap is lifted from the flange, possibly without any mechanical locking between the trap and the lid. Contamination of the surfaces exposed to the outside environment is then limited to the space between the two gaskets, which is very small if these gaskets are contiguous.

The invention will now be described by means of the following figures under the different aspects thereof:

Figure 4:
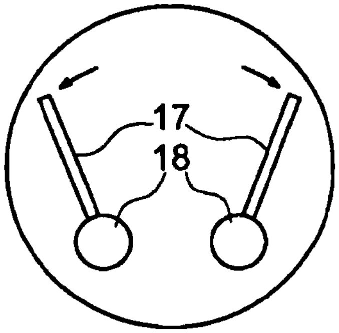

and FIG. 4 illustrates a mechanical locking mechanism.

Figure 1:
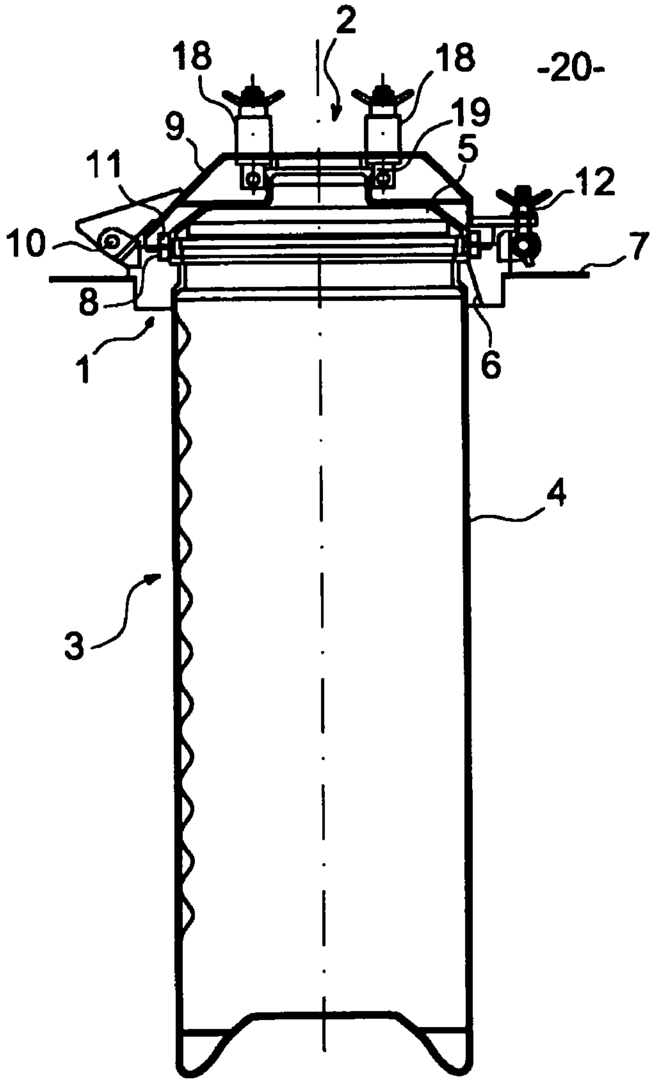
FIG. 1 is an overview of the apparatus, in a state where the barrel is mounted thereupon, in the closed state.

With reference to FIG. 1, the apparatus comprises as the main elements a flange 1 and a top assembly 2 functioning in cooperation for seizing and opening a barrel 3 consisting of a lower and cylindrical container 4 and a lid 5 mounted on the container 4. The flange 1 is circular and comprises an opening 6 into which the top of the container 4 is engaged. It is generally fastened to a horizontal wall 7 forming a barrier between the outside environment, herein below the same, and a closed enclosure 20, located above and which may be contaminated. The opening 6 is conical, tapering upward, so as to allow for sufficiently precise centering of the barrel 3 when it is elevated under the same. The flange 1 houses a first circular inflatable gasket 8 at the top thereof around the opening 6.

The upper assembly 2 mainly comprises an upward curved trap 9, with the lid 5 entering in a cavity thereof. The trap 9 is articulated at the flange 1 by means of a hinge 10 having a horizontal axis. A second inflatable gasket 11, which is also circular, is arranged under the trap 9 while being immediately adjacent to the first inflatable gasket 8 when the apparatus is closed (state of FIG. 1). There is a lock between trap 9 and flange 1: it consists of a toggle bolt 12 located opposite hinge 10; when it is raised, it will prevent trap 9 from being lifted, but when it is folded sideways, disconnection thereof is possible.

Figure 3:
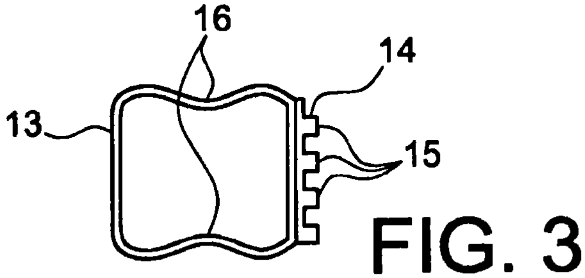
FIG. 3 represents a view of a gasket well suited for the invention.

FIG. 3 represents either of the inflatable gaskets 8 and 11 in section: they consist of a chamber 13 having a rectangular cross-section and a pad 14. The latter is provided with reliefs 15 to make it easier to lock onto the container 4 or the lid 5. It is joined to the chamber 13. The chamber is flexible, namely at the flat and mutually parallel flanks 16 thereof, ending at the outermost radial sides: they are corrugated so that blowing gas into the chamber 13 will expand the gasket inward so that the pad 14 will fit tightly round the container 4 or the lid 5.

Another aspect of the invention is also apparent from FIG. 4. It consists of bars 17 located under the trap 9 and articulated thereat by means of wheels 18. With the axes of the wheels 18 being vertical and the bars 17 being parallel and horizontal, they can turn one toward the other so as to fit tightly around a collar 19 protruding at the top of the lid 5.

Figure 2:
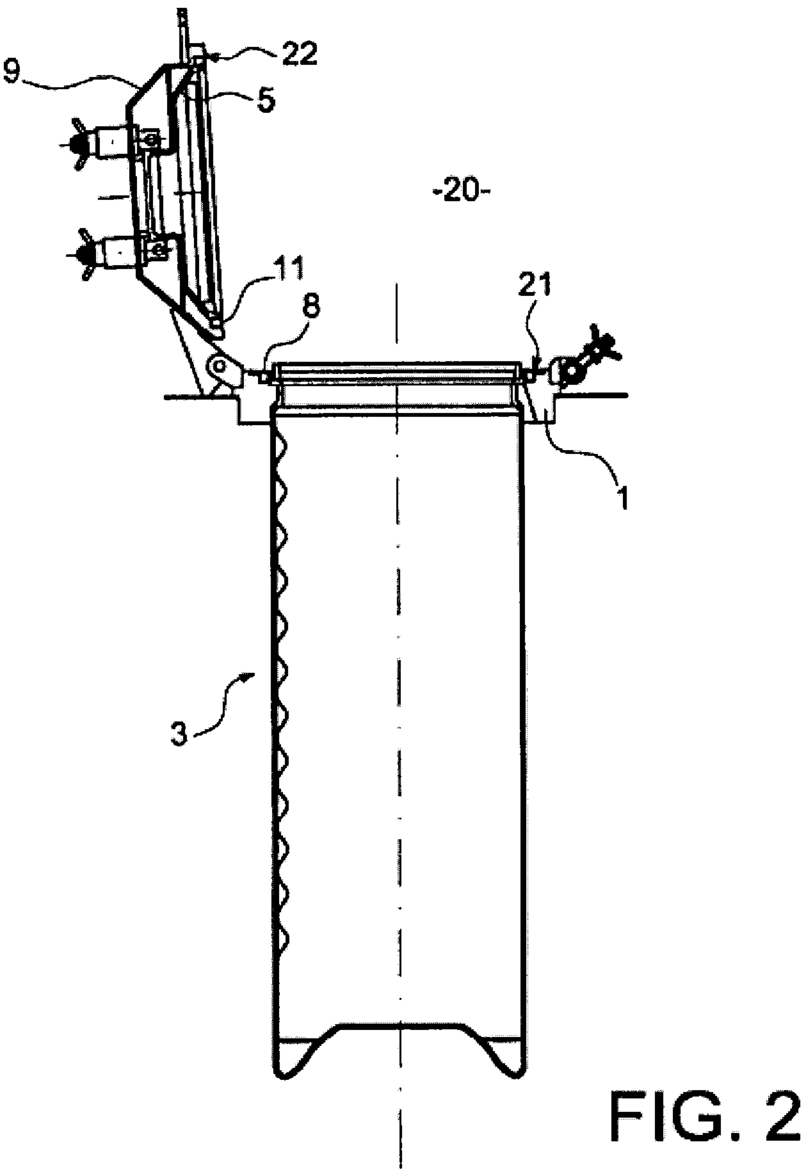
FIG. 2 represents the system in the open state.

The operation of the apparatus can be described like this. First of all, a barrel 3 is hooked up under the same by a conveyor or any other transport means. The barrel 3 is elevated into the opening 6 until the joining portions of the lid 5 and the container 4 arrive in front of their respective inflatable gaskets 11 and 8. When inflated, these gaskets will fit tightly around them. When the trap 9 is raised, the lid 5 is then lifted from the container 4 and will follow the same. The barrel 3 being open, which is the state in FIG. 2, it can be filled from the top of the wall 7. Inverted movements are then undertaken to make the trap 9 come down, deflate the gaskets 8 and 11 and remove the barrel 3. The inflatable gaskets 8 and 11 produce sufficient sealing for sufficiently holding the barrel 4 and the lid 5 and for lifting the latter. The bars 17 can be used for offering an additional precaution by being moved closer to each other so as to arrive under the collar 19 and provide additional support.

It is apparent that the apparatus is very simple. Contamination is limited to the surfaces exposed inside the enclosure 20 in the opening position of FIG. 2 and which are then situated on the outside environment. These are surface portions between the inflatable gaskets 8 and 11 for the apparatus and connection between the container 4 and the lid 5 for the barrel 3. Such surfaces are situated in areas 21 and 22. As gaskets 8 and 11 are very close to each other in the closed state, the surfaces are very small.

The invention claimed is:

1. A barrel docking and opening apparatus comprising:

a barrel including a container and a top lid;

a flange that engages the barrel in an opening of the flange; and an assembly that seizes and lifts the lid, the assembly being arranged above the flange, wherein the flange includes a first inflatable gasket disposed around the opening, the first inflatable gasket clamping the barrel, and wherein the assembly includes a mobile trap that encloses the lid, the trap including a second inflatable gasket that overlaps the first inflatable gasket so as to seize the lid when the trap is placed on the flange.

2. The barrel docking and opening apparatus according to claim 1, wherein the trap is articulated at the flange by a hinge.

3. The barrel docking and opening apparatus according to claim 2, further comprising a lock disposed between the flange and the trap on a side opposite of the hinge.

4. The barrel docking and opening apparatus according to claim 1, wherein the trap further includes a lid blocking mechanism that blocks the lid.

5. The barrel docking and opening apparatus according to claim 4, wherein the lid blocking mechanism comprises mobile bars under the trap.

6. The barrel docking and opening apparatus according to claim 1, wherein the first and second inflatable gaskets include a radially internal side with a circular pad including reliefs and corrugated flanks connected to the radially internal side.

7. The barrel docking and opening apparatus according to claim 1, wherein the first inflatable gasket clamps the container of the barrel when inflated.

8. The barrel docking and opening apparatus according to claim 1, wherein the second inflatable gasket clamps the lid of the barrel when inflated.

9. A docking apparatus comprising:

a horizontal wall;

a flange fastened to the horizontal wall, the flange including an opening and a first inflatable gasket; and an upper assembly attached to the flange via a hinge, the upper assembly including a trap and a second inflatable gasket arranged under the trap, wherein the second inflatable gasket overlaps the first inflatable gasket when the upper assembly is placed on the flange.

10. The docking apparatus according to claim 9, further comprising a lock installed between the flange and the upper assembly so as to prevent the trap from being raised.

11. The docking apparatus according to claim 10, wherein the lock is a toggle bolt.

12. The docking apparatus according to claim 9, wherein the trap includes a lid blocking mechanism having mobile bars under the trap.

13. The docking apparatus according to claim 12, wherein the mobile bars are articulated by wheels.

14. The docking apparatus according to claim 9, wherein the first and second inflatable gaskets include a radially internal side with a circular pad including reliefs and corrugated flanks connected to the radially internal side.

15. The docking apparatus according to claim 9, wherein each of the first and second inflatable gaskets further includes a chamber that has a rectangular cross-section.

16. The docking apparatus according to claim 9, further comprising a barrel including a container inserted into the opening, wherein the first inflatable gasket clamps the container of the barrel when inflated.

17. The docking apparatus according to claim 9, further comprising a barrel including a lid that is insertable into a cavity of the trap, wherein the second inflatable gasket clamps the lid of the barrel when inflated.

18. The docking apparatus according to claim 9, wherein the trap is domed.

* * * * *